United States Patent
Traylor

(10) Patent No.: US 6,856,884 B2
(45) Date of Patent: Feb. 15, 2005

(54) ACCELEROMETER GAUGE USING SOLID STATE ACCELEROMETERS

(76) Inventor: Chadwick Ray Traylor, 1640 E. Carla Vista Dr., Chandler, AZ (US) 85225

( * ) Notice: Subject to any disclaimer, the term of this patent is extended or adjusted under 35 U.S.C. 154(b) by 0 days.

(21) Appl. No.: 10/378,527

(22) Filed: Mar. 3, 2003

(65) Prior Publication Data

US 2003/0176962 A1 Sep. 18, 2003

Related U.S. Application Data

(60) Provisional application No. 60/362,042, filed on Mar. 6, 2002.

(51) Int. Cl.$^7$ .............................. G01P 15/00; G01G 7/00
(52) U.S. Cl. .............................. 701/70; 701/1; 702/141; 73/488
(58) Field of Search .............................. 701/70, 220, 1; 73/382 G, 382 R, 510, 488–495, 504.02, 504.03, 514.01, 514.02; 702/141; 257/417, 618

(56) References Cited

U.S. PATENT DOCUMENTS

| | | | | |
|---|---|---|---|---|
| 4,622,548 A | * | 11/1986 | Andres et al. .............. 340/971 |
| 4,908,767 A | * | 3/1990 | Scholl et al. ................ 701/220 |
| 5,353,226 A | * | 10/1994 | Repperger ................... 702/141 |
| 5,408,879 A | * | 4/1995 | Vreeburg et al. ......... 73/514.35 |
| 6,113,138 A | * | 9/2000 | Hermann et al. ........... 280/735 |
| 6,128,955 A | * | 10/2000 | Mimura ....................... 73/510 |
| 6,466,200 B1 | * | 10/2002 | Anton et al. ................. 345/163 |
| 6,615,125 B2 | * | 9/2003 | Eccleston et al. ............. 701/70 |
| 2003/0038779 A1 | * | 2/2003 | Baron et al. ................. 345/157 |

* cited by examiner

Primary Examiner—Jacques H. Louis-Jacques
(74) Attorney, Agent, or Firm—Russel C. Wells

(57) ABSTRACT

An acceleration gauge using solid-state accelerometers positioned along the major axes of a motor vehicle record and display values representing the acceleration forces on the vehicle. The acceleration gauges, of which there are at least two positioned along the major x-y axes, develop signals to a housing having a microprocessor-based system. The housing is connected to either an analog or digital read out system wherein the various accelerations are displayed. The system can be an analog or digital system using discrete wiring or fiber optics to convey light signals. In the preferred embodiment there are three accelerometers positioned a various locations on the motor vehicle and their signals generate relative forward and reverse speed signals and vehicle tilt angles with respect to the horizontal.

5 Claims, 9 Drawing Sheets

ACCELEROMETER GAUGE USING SOLID STATE ACCELEROMETERS

CROSS REFERENCE TO RELATED APPLICATION

This application is related to co-pending Provisional Patent Application claiming the benefit of Ser. No. 60/362,042 entitled "Accelerometer Gage Using Solid State Accelerometers" filed on Mar. 6, 2002 by Chadwick Ray Traylor.

FIELD OF THE INVENTION

This invention relates to accelerometers in general and more particularly to an accelerometer module as may be used in the brake light system of a motor vehicle or a braking/deceleration/acceleration warning system for any moving body.

SUMMARY OF THE INVENTION

This is an acceleration gauge using solid-state accelerometers for use in automotive, aircraft, marine or any application requiring acceleration measurements. The use of accelerometers along all of the major axes of the motor vehicle will generate data to a read-out about the status of the vehicle such as forward, reverse and vertical acceleration, and tilt with respect to the travel surface.

It is therefore a major advantage to have solid-state accelerometers positioned at the c.g. of the vehicle with secured signal lines routed to a gauge located in the cockpit of the vehicle.

It is yet another advantage to provide a system wherein the total acceleration vectors are summed and available to the reader of the gauge upon the actuation of a selector switch.

These and other advantages are found in the acceleration gauge typically used in a vehicle. The gauge uses solid-state accelerometers wherein a first accelerometer is mounted along one axis of the vehicle. The first gauge is responsive to the vehicle movement along one axis and generates a first acceleration signal.

A second accelerometer is mounted along a second axis of the vehicle and responds to the vehicle movement along a second axis. The second accelerometer generates a second acceleration signal; A third accelerometer is mounted along a third axis of the vehicle and responds to the vehicle movement in the vertical direction and generates a third acceleration signal. The accelerometers have signal transmission lines connected to a housing with a microcomputer-based system located therein. The system has input for receiving the acceleration signals and processes the signals by an algorithm stored in a memory. The system has a calculation means that responds to the several steps of the algorithm and the acceleration signals for generating control signals.

Located in the system are power drivers that respond to the control signals and generate driver signals. The driver signals control one or more displays for generating both analog and numeric displays to give acceleration values of the vehicle movement in human readable form.

These and other advantages will become apparent in the following drawings and specification wherein:

DESCRIPTION OF THE PREFERRED EMBODIMENT

Executive Description of the Invention

The preferred embodiment of the present accelerometer is typically found in a motor vehicle application, but the application is not so limited. Airplanes, marine vehicles, on-road and off-road vehicles are also potential users of the accelerometer.

The accelerometer gauge of the present invention measures positive and negative accelerations along each axis and has the capability in the algorithm to store the highest acceleration value in each axis. This will allow the driver of the vehicle to know the highest acceleration forces in each axis direction that the driver's vehicle has experienced. Thus, a racecar driver, as an example, can drove the vehicle any distance or number of laps at any speed, and even repeat the same laps at different speeds to determine when both the driver and vehicle are experiencing the largest acceleration forces on each axis. This information will give the driver valuable information on how the vehicle should be driven for maximum race efficiency. As will hereinafter be shown, the acceleration gauge provides special switches that allow the various independent gauges to be reset to allow new information to be inputted to the gauges.

The "x" accelerometer provides both positive and negative acceleration values in the longitudinal or horizontal direction. The "y" accelerometer provides both positive and negative acceleration values in the orthogonal direction to the "x" axis and the "z" accelerometer provides both positive and negative acceleration values in the vertical direction as the vehicle become air-born or is following a course that change altitude.

As will be shown, the algorithm using the values from each of the three accelerometers will calculate the "tilt" acceleration forces as the vehicle leans in one of the directions such as when the vehicle is turning.

DETAILED DESCRIPTION OF THE INVENTION

Figure 1:
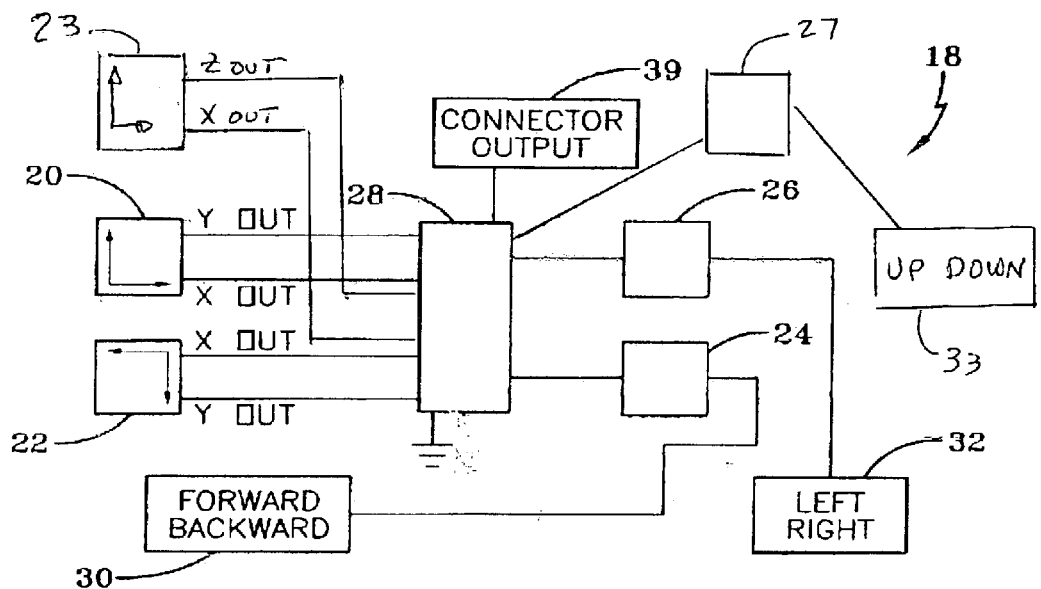
FIG. 1 is a schematic of the accelerometer gauge system of the preferred embodiment.

FIG. 1 illustrates a schematic of one embodiment of the acceleration gauge 18 of the present invention. There is shown the first 20, second 22 and third 23 accelerometers, a forward and reverse or backward gauge 24, a left and right gauge 26, an up and down gauge 27, a microprocessor 28, forward and backward gauge electronics 30, left and right gauge electronics 32 and up and down gauge electronics 33. The microprocessor system is housed in a housing and is a Parallax basic stamp II-SX. A connector output terminal 34 emanates from the microprocessor housing. The electrical output connector is also available for receiving input signals to the gauge. Such signals, which are generated from the circuitry and applied, to the read-out locations are also outputted from the electrical output connector. The above components are all interconnected in a manner similar to that shown in FIG. 1.

Figure 2A:
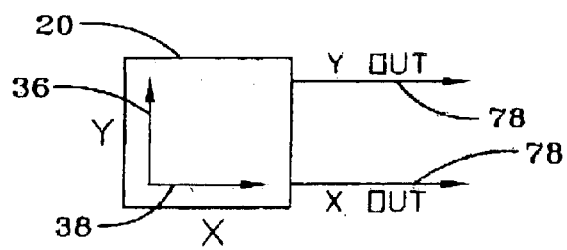
FIG. 2A is a block diagram of one of the solid state accelerometers.
Figure 2B:
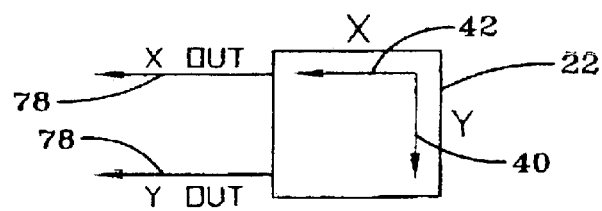
FIG. 2B is a block diagram of another of the solid state accelerometers.

Referring to FIGS. 2A and 2B are illustrations of two dual axis accelerometers 20, 22 such as the analog devices ADXL202AE. One of the analog devices 20, FIG. 2A, would measure forward acceleration and left acceleration. The second analog device FIG. 2B, would measure reverse deceleration or breaking deceleration and right acceleration. In FIG. 2A, the first accelerometer, ACC1, operates according to the vector chart on the accelerometer illustrating forward acceleration on the "+y" axis 36 and left to right acceleration on the "+x" axis 38. FIG. 2B is the second accelerometer, ACC2, illustrating backward acceleration on the "-y" axis 40 and right to left acceleration on the "-x" axis 42.

Figure 3:
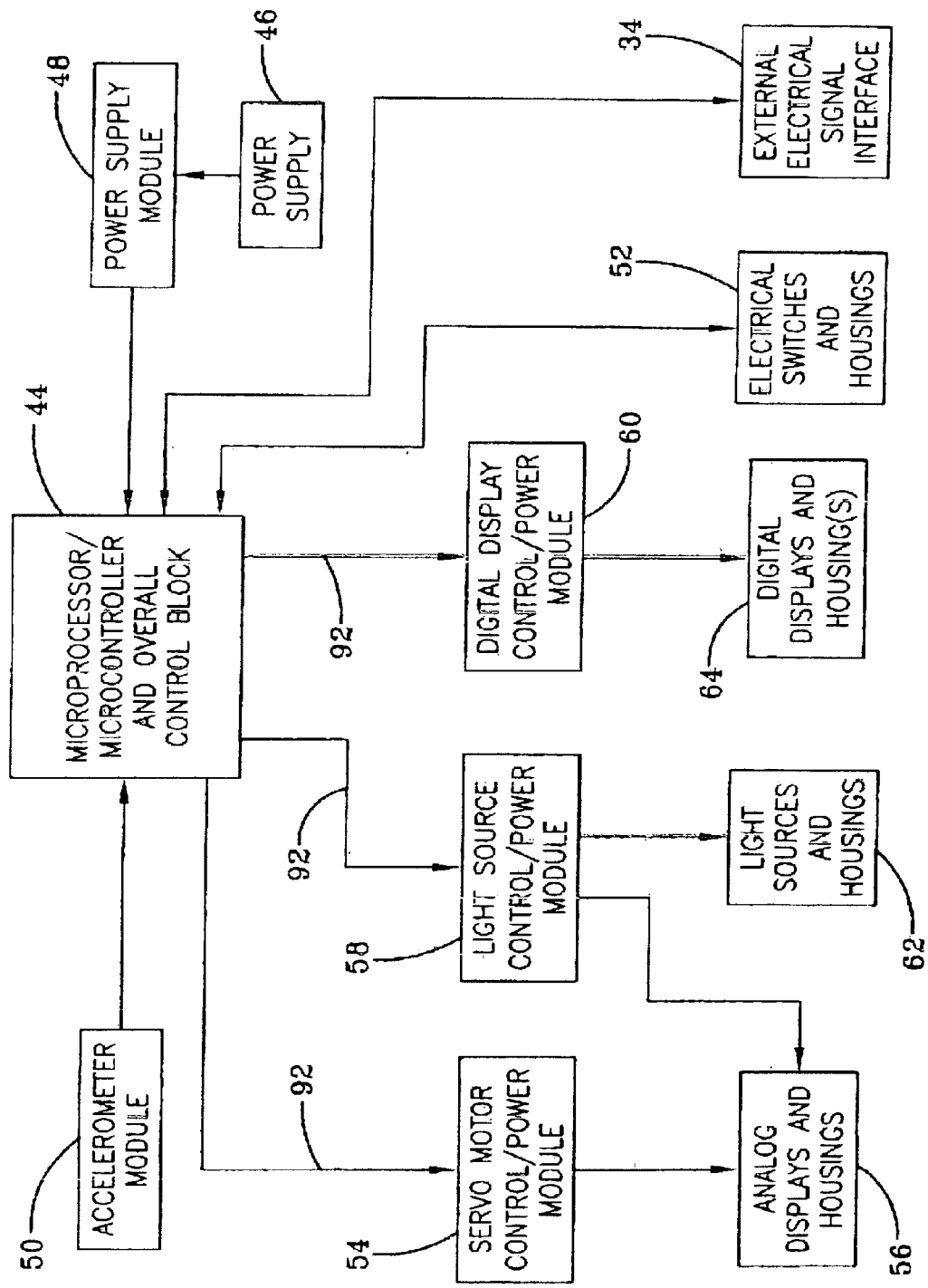
FIG. 3 is an enlarged block diagrammatic schematics of the solid-state accelerometer gauge of FIG. 1.

Referring to FIG. 3, the block diagrammatic schematic of FIG. 1 is enlarged showing more of the details of the several modules of the gauge 18. These modules are the microprocessor module 44 receiving power from the power supply 46 via the power supply module 48. Other inputs to the microprocessor are the accelerometer module 50, the electrical switches 52 and the external electrical signal interface 34.

Several of the outputs of the microprocessor 44 are the servo motor control module 54 that controls the analog displays 56 such as dial gauges, the light source control module 58 which is also usable on the dial gauges, and the digital display module 60. The light source control module 58 controls the lights in the analog displays to indicate the values supplied to the gauge, as will be illustrated in FIG. 13 in the same manner as does a pointer dial and the light sources 62. The digital display module 60 controls the digital displays 64 in the gauge 18.

Figure 4:
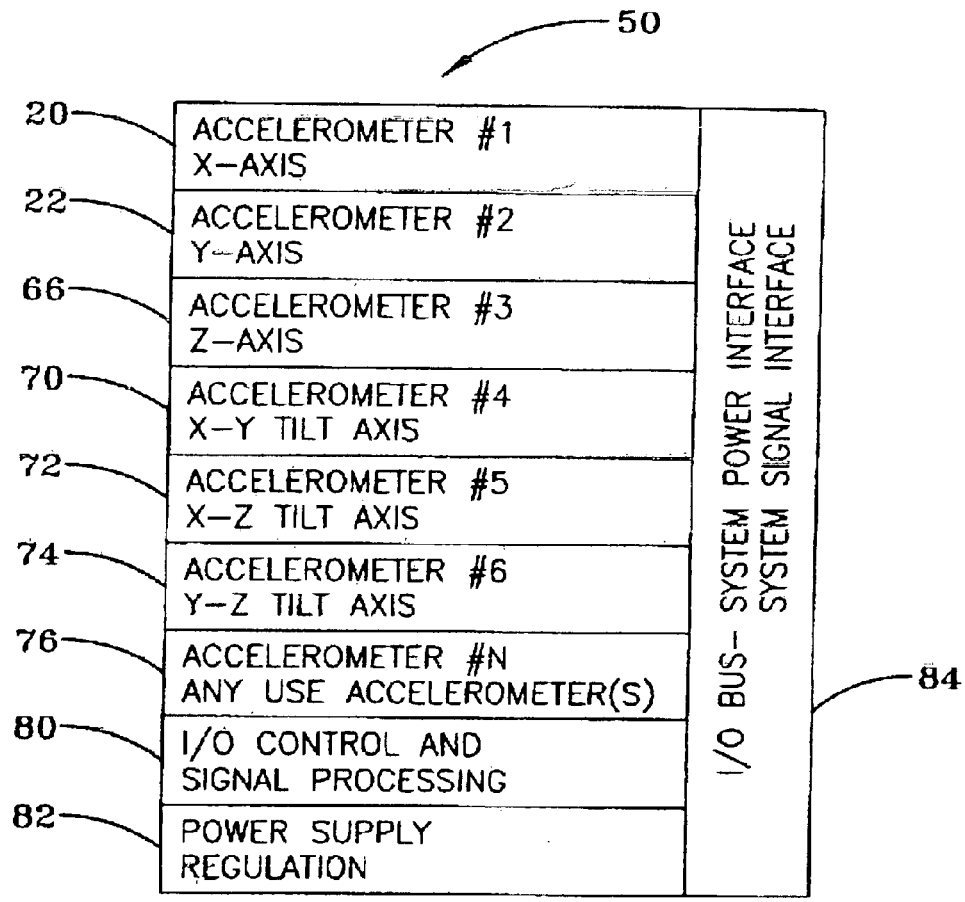
FIG. 4 is an enlarged view of the accelerometer module of FIG. 3.
Figure 4A:
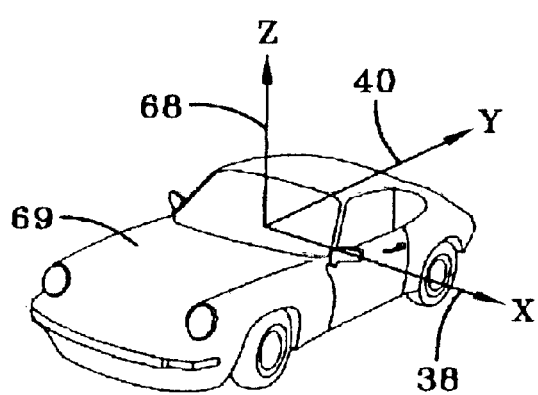
FIG. 4A is a diagram of a motor vehicle illustrating the several axes when the vehicle is at rest.
Figure 4B:
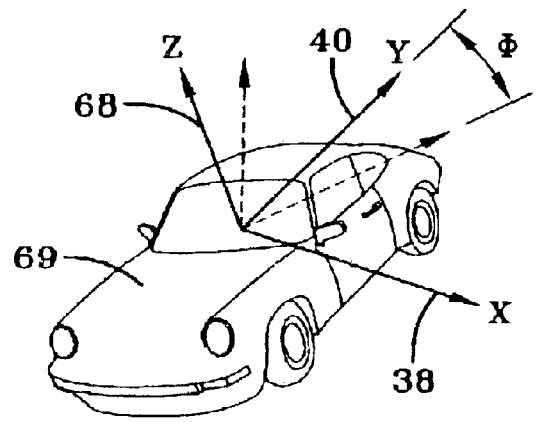
FIG. 4B is a diagram of the motor vehicle of FIG. 4A when the motor vehicle at a tilt angle.

Referring to FIG. 4, there is illustrated the accelerometer module 50 in detail. Previously in FIG. 1 there was illustrated only three accelerometers 20, 22, 23; as this a complete gauge 18, more accelerometers can be added. In FIG. 4, there is shown another accelerometer 66 for the z-axis 68. The z-axis 68 is defined as the axis that is orthogonal to the x-y plane or vertical axis and in a direction that would be a direction of lift. Referring to FIGS. 4A and 4B illustrates the three axes as applied to a motor vehicle 70. The vehicle 70 in FIG. 4A is at rest with the -y axis 40 horizontal or longitudinal to the ground. In FIG. 4B the -y axis 40 is raised at an angle Ø relative to the ground. Such an occurrence will take place during hard vehicle braking or as the vehicle travels up and down hills. The z-axis accelerometer 66 is used as the vertical sensor with basic trigonometry calculations in the algorithm 67 and the calculation means 69 of the microprocessor 28, the tilt angle Ø is calculated and then the y-axis acceleration is calculated.

Referring to FIG. 4, additional accelerometers that may be provided are the x-y tilt axis 70, the x-z tilt axis 72, the y-z tilt axis 74 plus other accelerometers 76 as selected by the design engineer. In particular the x-y tilt axis acceleration 70 is measured by an accelerometer that is positioned at an angle to the x and y axis, typically a 45° angle. Likewise the x-z axis and the y-z tilt axes accelerations 72, 74 have accelerometers positioned at an angle to the axes. One of the main purposes of the tilt calculation is to recalibrate the gauge 18 due to the vehicle being on a non-level surface.

The acceleration signals 78 generated from the accelerometers are typically very low. The electrical wiring transmitting the acceleration signals should be shielded from EMI and appropriate amplifiers should be positioned as close to the accelerometers as possible to amplify the signal. These amplifiers and shielding are found in the I/O control and signal processing section 80. If desired, the electrical design engineer may add power supply regulation 82 in the module 50. The output of the module 50 is an I/O bus 84.

Figure 5:
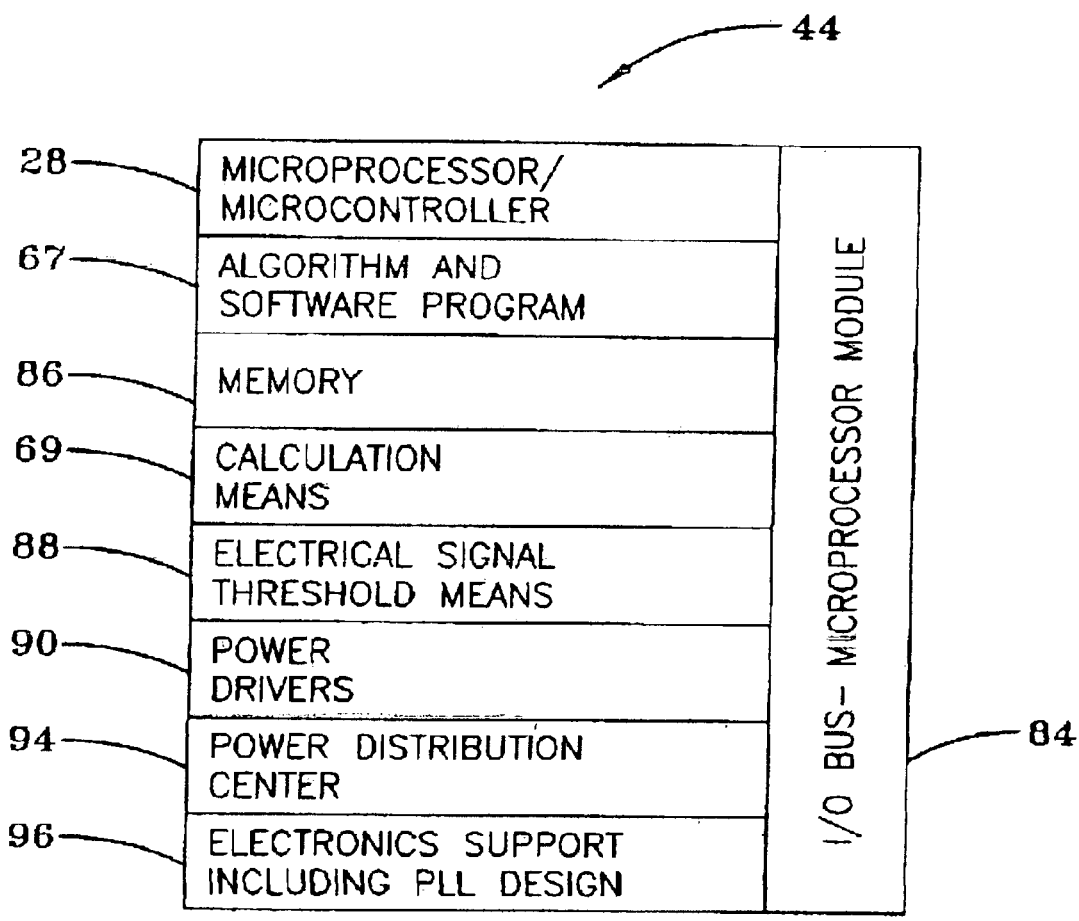
FIG. 5 is an enlarged view of the microprocessor module of FIG. 3.

Referring to FIG. 5, microprocessor module 44 is illustrated in more detail. The algorithm 67 is stored in the memory 86. The calculation means 69 is coupled to the algorithm 67 and the memory 86 to perform the necessary calculations from the acceleration signals 78. The calculation means 69 generates control signals that are applied to power drivers 90 for generating driver control signals 92. These driver control signals 92 are emanated from the I/O bus 84 to the several modules 54, 58, and 60. Other sections of the microprocessor module 44 are a power distribution center 94 and support electronics including phase lock loop control 96.

Figure 6:
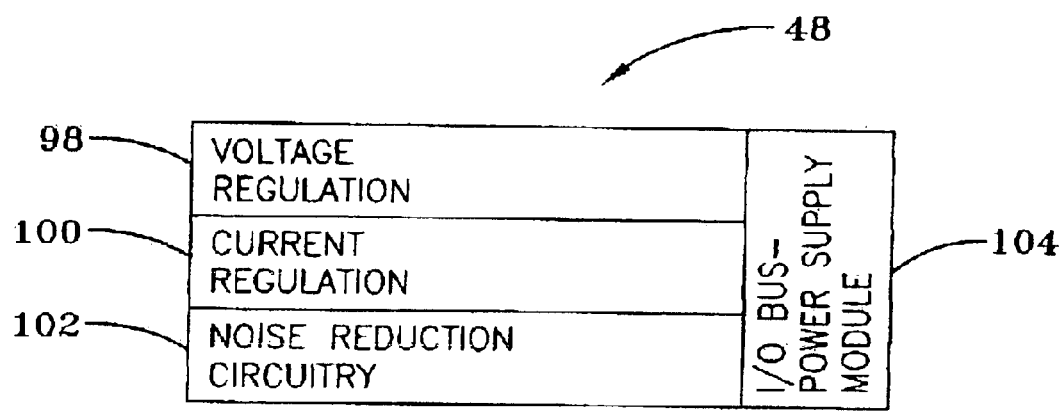
FIG. 6 is an enlarged view of the power supply module of FIG. 3.

Referring to FIG. 6, the power supply module 44 illustrates the types of controls normally found in such a module. These are a voltage regulation section 98 that controls the level of the voltage to the several control circuits. A current regulation section 100 may be also used and placed in the power supply module. The several power level signals that are controlled by the power supply module 48 are conditioned by noise reduction circuitry 102 and then are outputted from the I/O bus 104 in the module 48.

Figure 7:
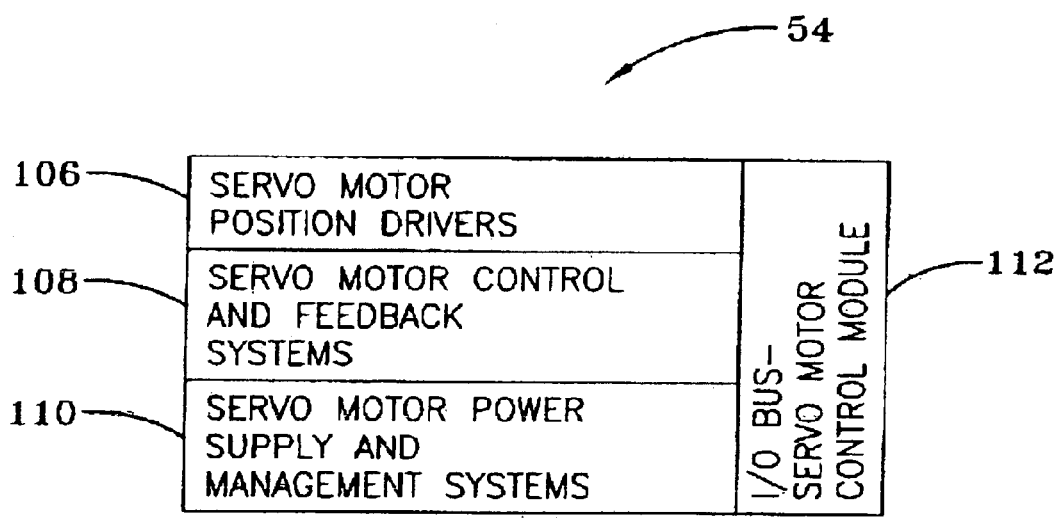
FIG. 7 is an enlarged view of the servo motor control module of FIG. 3.

FIG. 7 represents the servomotor control module 54. Located therein are the servo motor position drivers 106, servo motor control feedback systems 108 and servo motor control power supply systems 110. These several functions are within the control of the system designer and how such subsystems are implemented. All signals to and from this module are connected through its I/O bus 112.

Figure 8:
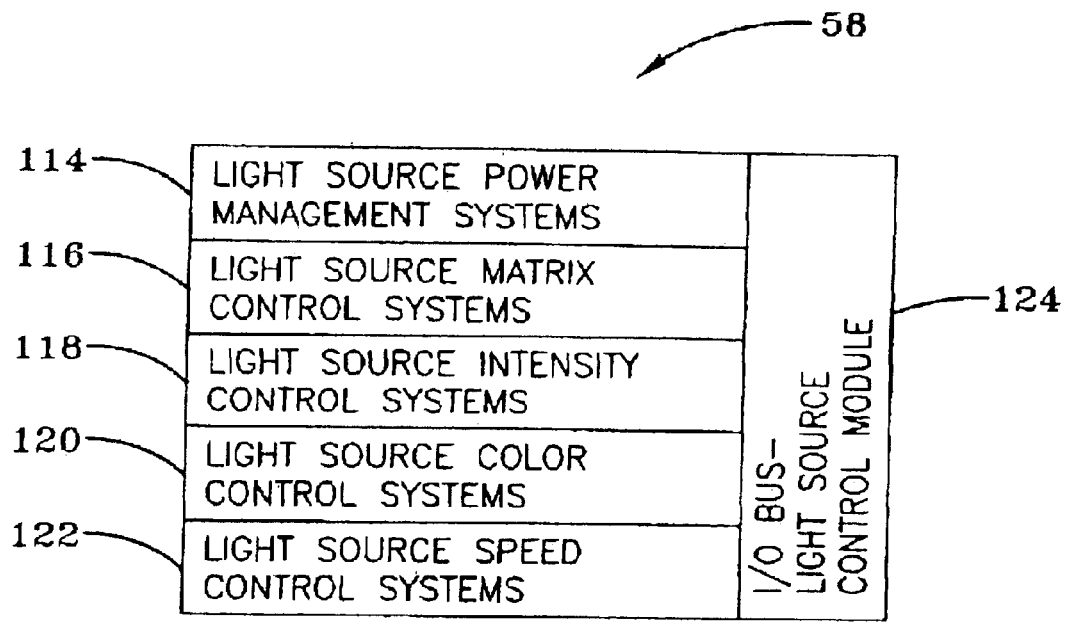
FIG. 8 is an enlarged view of the light source control module of FIG. 3.

FIG. 8 illustrates the content of a light source module 58 if the gauge 18 has illumination. The gauge 18 may have its readout to be a light actuated system wherein the several read-out markers are identified by LEDs. If the gauge 18 is a light actuated gauge, the several functions such as the light source display power management systems 114, matrix control system 116, intensity control 118, color control 120 and display speed 122 are contain herein. All electrical signals to and from the module 58 are through the I/O bus 124.

Figure 9:
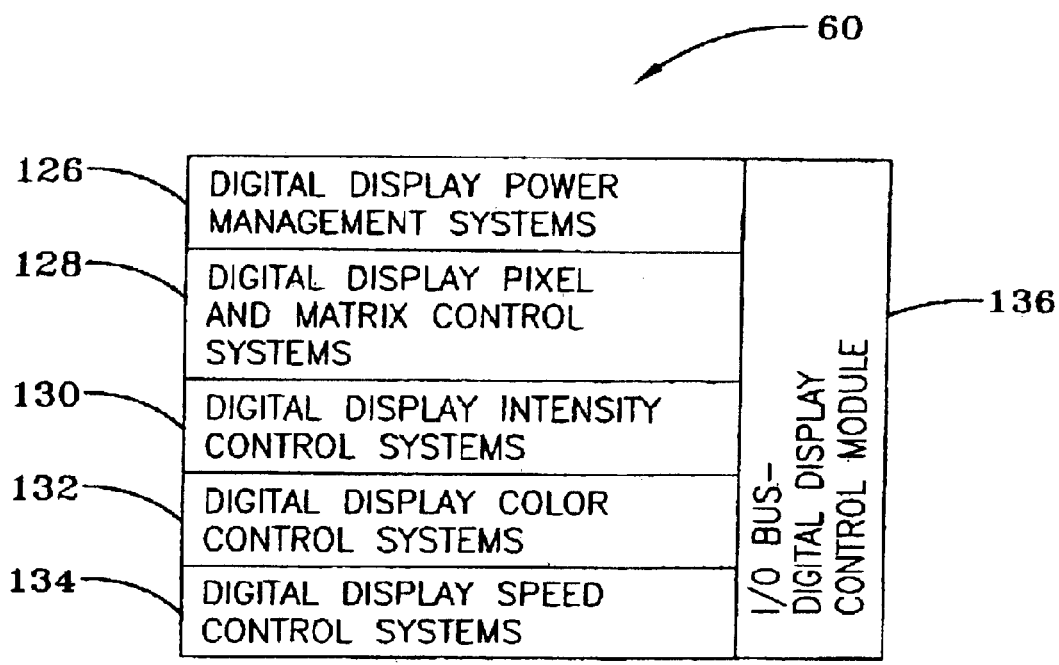
FIG. 9 is an enlarged view of the digital display control module of FIG. 3.

FIG. 9 is similar to FIG. 8 in that it is the digital display control 60. Typically, the digital display and the light display have similar control functions. If the gauge 18 is a digital display gauge in completely or in part, the several functions are similar. These functions are the digital display power management systems 126, pixel and matrix control system 128, intensity control 130, color control 132 and display speed 134 are contained herein. All electrical signals to and from the module 60 are through the I/O bus 136.

Figure 10:
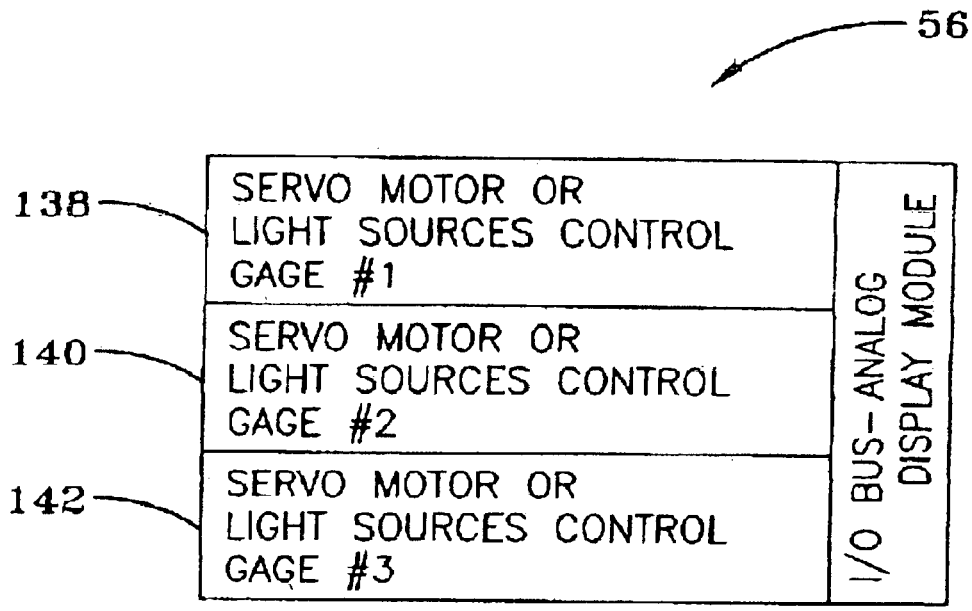
FIG. 10 is an enlarged view of the combined analog and light source modules of FIG. 3.

Referring to FIG. 10, the analog display module 56 and the light source display module 62 are combined. The Fig. is shown with the use of three servomotors and/or light sources control 138, 140, 142 for controlling the displays in the gauge 18. When the dials in the gauge are analog, typically servomotors are used to move or rotate the needles on the dials. Other drive control systems for the analog-gauge indicator needles may be accomplished by servomotors crystal watch movement, typical magnet needle movement devices/gauges and by stepper motors. Other drive control systems include DC motors, synchronous motors, three-phase motors (AC), and other similar type of electromagnetic motor system. As will hereinafter be shown with FIG. 13, light sources can be located on the dials to indicate the dial readings.

Figure 11:
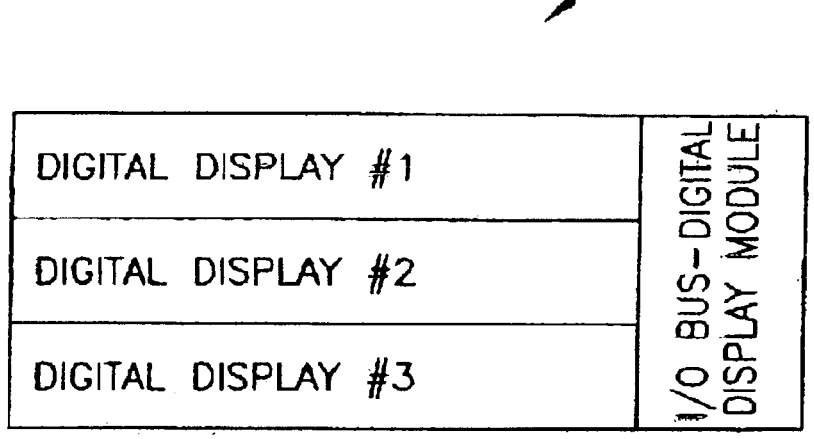
FIG. 11 is an enlarged view of the digital display module of FIG. 3.

FIG. 11 is a detail of the digital display module 64 illustrating three or more digital displays are capable of being controlled by the system.

Figure 12:
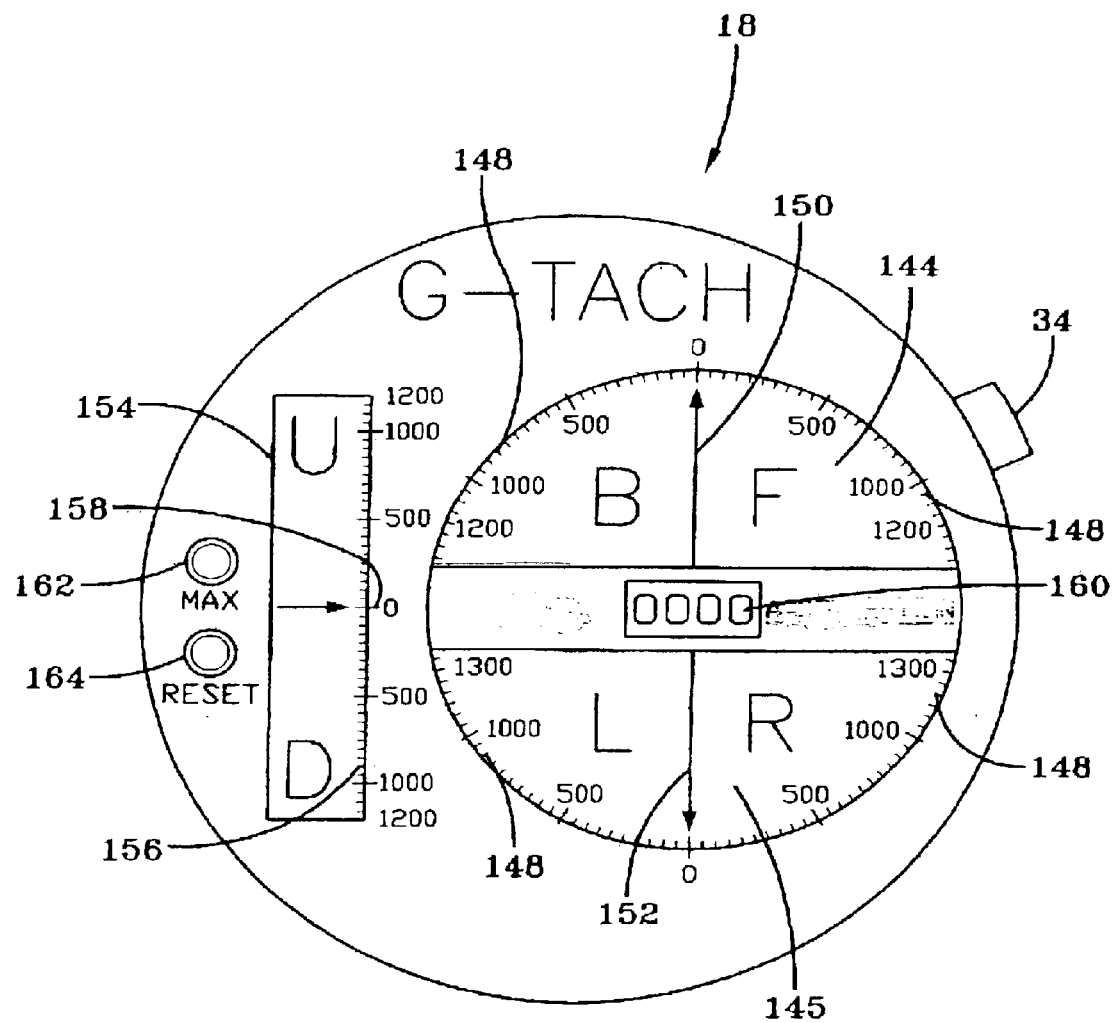
FIG. 12 is a face view of an accelerometer gauge of the present invention.

Referring to FIG. 12 the gauge 18 has four quadrants 144–147. Reading clockwise, the first quadrant 144, "F", is a forward acceleration indicator. It is divided into measuring points 148 in a clockwise direction beginning from the twelve o'clock position. The needle 150 is shown in a normal position at twelve o'clock. The first accelerometer 20 operates to show forward and/or reverse acceleration. This occurs when the forward acceleration causes the needle 150 to move from center "0" position to the right toward the gauge marked "F". Reverse acceleration causes the needle 150 to move from the zero position to the left moving toward the gauge marked "B" or braking.

The fourth quadrant 145, "R", is a right acceleration indicator. It is divided into measuring points 148 in a counterclockwise direction beginning from the six o'clock position. This portion of the gauge indicates acceleration from left to right as when making a right turn. The needle 152 is shown in a normal position at six o'clock. This second accelerometer 22 operates to show the needle 152 going from the center or six o'clock position to the right moving toward the gauge marked "R".

The third quadrant 146, "L", is a left acceleration indicator. It is divided into measuring points 148 in a clockwise direction beginning from the six o'clock position. This portion of the gauge 18 indicates acceleration from right to left as when making a left turn.

The second quadrant 147, "B", is a braking or deceleration indicator. It is divided into measuring points 148 in a counterclockwise direction beginning at the twelve o'clock position and moves toward the gauge marked "B". This portion of the gauge indicates deceleration when the vehicle 69 is braking.

On the left side of the gauge 18, is a vertical Up-Down acceleration gauge 154 with the measuring points or indices 156 increasing from the center point 158 of the gauge 154. "U" being the up position and "D" being the down position and this gauge responds to the "z" axis accelerometer 66 as previously explained.

Along the central horizontal axis of the gauge 18 is a band having a plurality of digital or numerical read-out locations 160. This portion of the gauge 18 indicates total acceleration or any other parameter calculated by the microprocessor from the accelerometer inputs. This shows the summed acceleration vectors and shows the maximum summed acceleration when the "max button" 162 is depressed. In the alternative, this digital read-out can be programmed to show the maximum acceleration on any axis as hereinbefore explained.

The max button 162 is shown located to the left of the Up-Down acceleration read-out gauge 154. If the Up-Down acceleration read-cut gauge is not used, then the max button 162 could be typically located to the right of the read-out locations and is approximately located at the three o'clock position of the gauge 18. The actual position of the max button 162 is a design choice. The max button 162 activates the digital read-out locations 160 and when depressed will drive all of the servo-motors driving the needles to the maximum number indicated.

Located near the max button 162 is a reset button 164. The reset button 164 will likewise cause the gauge 18 to read-out the maximum-recorded acceleration to the memory unit 86 and then when released will reset the read-out locations 160.

The location of the several read-out locations 160 on the face of the acceleration gauge 18 is a matter of design.

Positioned along the circumference of the gauge 18 is an electrical output connector 34. In FIG. 12, it is shown at approximately two o'clock. From this output connector 34, the acceleration values may be outputted which are any forms of signal consistent with the mode of the output desired. Such modes are analog, digital, mechanical, or any other characteristic signal that is capable of generating the acceleration signal values for input to a computer or other device.

The accelerometer gauge 18 is illuminated by any number of various light emitting devices such as LED's, LCD's, or any type of infrared device. Recording devices may be added to the accelerometer gauge 18.

With only three needle read-outs as shown in FIG. 12, the upper needle 150 gauge is connected to the ACC1 20 y-axis 36. The lower needle read-out is connected to ACC1 20 x-axis 38 and the ACC2 22 x-axis 42 and the Up-Down gauge is connected to the z-axis accelerometer. Accelerometers are capable of indicating or measuring negative axis accelerations.

Figure 13:
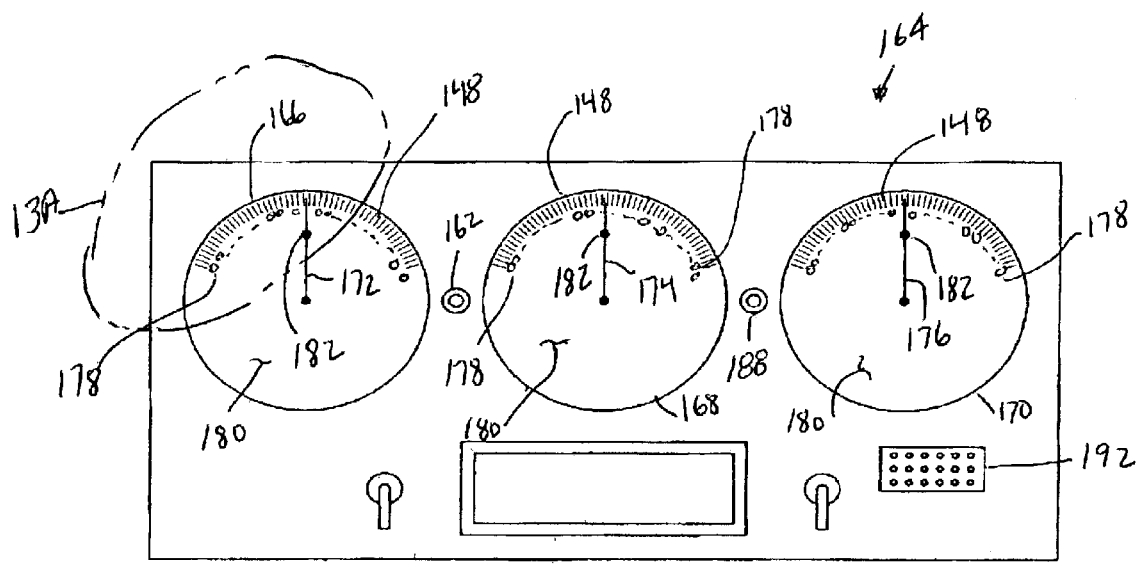
FIG. 13 is a face view of an alternate embodiment of an acceleration gauge of the present invention.
Figure 13A:
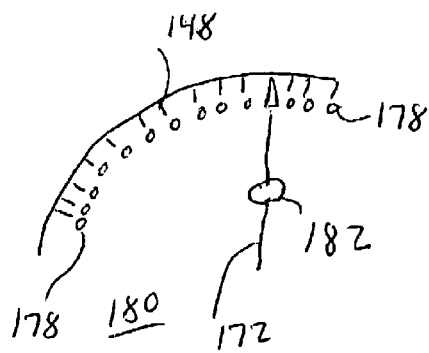
FIG. 13A is an enlarged view of the measuring points and the light source on each dial.

Referring to FIG. 13 is an example of an alternate embodiment of a complete acceleration gauge 164. This is an example where each of the gauges 166, 168, 170 that are of interest to the driver is an individual gauge. As an example, the first gauge 166 is a vertical acceleration gauge, the second gauge 168 is a longitudinal acceleration gauge and the third gauge 170 is a lateral acceleration gauge. The order and type of readout from the various gauges is a matter of design. In FIG. 13 each gauge 166-168-170 is an analog gauge with the needles 172, 174, 176 pivoting from the center of the gauge. The needles can pivot both left and right from the center or twelve o'clock position. As illustrated, each gauge has measuring points or indices 148, which in FIG. 13 extend from approximately the nine o'clock to the three o'clock position. As an alternative, or in addition to the needle, a small light emitting read-out bulb 178 can identify each measuring point.

Positioned within the field of the gauge faceplates 180 and shown in line with the twelve o'clock position are larger lights 182 that indicate a warning to the driver. These warning lights 182 may be used to indicate when the actual value being calculated by the microprocessor-based system is beyond that which the driver wants to be. This may be a maximum acceleration value, a maximum "g" value or whatever. The value is a design option and is loaded into the algorithm 67 so that when the value is reached, the lights 182 are illuminated.

The first gauge 166 reads vertical acceleration and the dial markings 148 are from +1000 mg through 0 to −1000 mgs. Zero mg is at the twelve o'clock position. If a vehicle is climbing a hill, the acceleration could reach a number of Gs. A 1.0 G measurement is 1000 mgs or gravity. Note that if the vehicle becomes air-borne and is a free-falling body, the acceleration of 0 mgs would be encountered. Thus, the center warning light 182 could be lighted at 1500 mgs or less than 500 mgs. This gage 166 displays both real-time and maximum acceleration measurements.

The second gauge 168 indicates the forward and backward acceleration placed on vehicle or body when vehicle is stopped and level. This gage centers on 0 mgs. If the vehicle or body decelerates, acceleration could reach −1000 mgs or 1000 mgs in reverse direction. If vehicle accelerates rapidly by speeding up, acceleration could reach +1000 mg or 1000 mg in forward direction. The warning light 182 will light at accelerations of greater than 500 mgs in reverse direction (greater than 500 mgs of deceleration) and at acceleration greater than 500 mg in forward direction (greater than 500 mg of acceleration). This gage 168 displays both real-time and maximum acceleration measurements.

The third gauge 170 indicates the lateral acceleration placed on the vehicle or body. When vehicle as stopped and level, this gage centers on 0 mg. If the vehicle or body makes a hard left turn (or any degree of left turn) the acceleration could reach 1001 mgs in the left direction. If the vehicle or body makes a hard right turn, the acceleration could reach 1000 mg in the right direction. The warning light 182 will light at accelerations greater than 500 mg in the left direction and at accelerations greater than 500 mg in the right direction. This gauge 182 displays both real-time and maximum acceleration measurements.

The digital display 184 displays both real-time and maximum acceleration measurements for the vertical, longitudinal and lateral accelerations. If the display 184 is divided into at least three sections, all of the accelerations can be read simultaneously. This allows the user to see analog and digital, real-time and maximum displays, simultaneously. The digital display 184 is a two line sixteen characters per line display although any size can be used. The display 184 can also be backlit.

When the max button 162 is depressed and held depressed this causes the maximum acceleration vectors/values experienced by accelerometers since the last reset to be displayed on the analog gages 166, 168, 170 and digital display simultaneously 184. All three axes of acceleration and both direction and magnitude of maximum accelerations are displayed. Also works for the tilt mode.

When the accelerometer node/tilt mode switch 186 is in the accelerometer mode the accelerometer gauge system operates as desired above. When this switch 186 is in the tilt mode both the analog gages and the digital display displays the levels of tilt for each of the three tilt axes in units of degrees. The three axes of tilt are the X-Y, the X-Z, and the Y-Z.

When the max button 188 is depressed and held depressed this causes the maximum tilt calculations expressed by accelerometers since the last reset to be displayed on the analog gages 166, 168, 170 and digital display 184 simultaneously. All three axes of tilt and both magnitude and directions of tilt are displayed. Tilt is calculated using basic trigonometry and differences in accelerometer values by the operation of the algorithm 67. The tilt values or all three above described axes are both real-time and static for maximum tilt display when using the max button 162.

In the tilt mode the warning lights 182 will light at angle of tilt greater than 15° for any axis. The analog gage faceplates 180 have both mg and degree of tilt, i.e. tilt degree markings 148. The digital display 184 shows both inputs of mg for acceleration mode and units of degrees for tilt mode. The tilt angle range of the prototype is from zero to ninety degrees for all three-tilt axes. The tilt mode can use up to all six accelerometers shown in the accelerometer module FIG. 4. More than six accelerometers may be used as well.

When the reset button and switch 188 is depressed and released the maximum display value held in the memory of the microprocessor memory 86 is cleared or zeroed for all three acceleration axes and all three-tilt axes.

The on-off power switch 190 is used to remove power from all the electronics and accelerometers causing a complete system shutdown.

The two-way electrical and optical signal interface 192 provides a means for all electrical and optical signals to be sent/received from an external source. Any electrical and/or optical signal may be sent or received via this port. All functionality described this far is valid.

Figure 14:
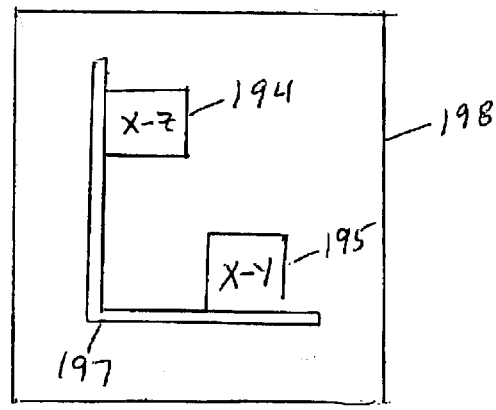
FIG. 14 is a view of a two accelerometer mounting as may be used in the alternate embodiment of FIG. 13.

FIG. 14 illustrates the mounting of two accelerometers 194, 195 namely an x-z axis and x-y accelerometer on a bracket 197 in a housing 198 that is shielded from EMI signals. By this means all three axis, x, y, z, can be calculated and the result displayed on the gauge.

It is understood that many different technologies may be use without departing from the spirit of the invention. Some of such technologies may be wireless, optical, light transmission, etc. to name but a few.

While the present invention has been described in an illustrative manner, it should be understood that the terminology used is intended to be in a nature of words of description rather than of limitation.

Accordingly, various changes and modifications may be made to the illustrative embodiment without departing from the spirit or scope of the invention. It is to be appreciated that those skilled in the art will readily apply these teachings to other possible variations of the inventions. However, it is intended that the scope of the invention not be limited in any way to the illustrative embodiment shown and described but that the invention be limited only by claims appended hereto.

What is claimed is:

1. An acceleration gauge using solid state accelerometers for a vehicle, comprising:

a first solid state accelerometer mounted substantially along one axis of the vehicle and responsive to the vehicle movement along said one axis to generate a first acceleration signal;

a second solid state accelerometer mounted substantially along a second axis of the vehicle and responsive to the vehicle movement along said second axis to generate a second acceleration signal;

a third solid state accelerometer mounted substantially along a third axis of the vehicle and responsive to the vehicle movement along said third axis to generate a third acceleration signal;

a housing;

a microcomputer located in said housing and having an input for receiving said acceleration signals, a memory, an algorithm stored in said memory, said algorithm programmed to align each of the first, second and third accelerometers accurately along said axes regardless of their initial positioning, calculation means responsive to said algorithm and said acceleration signals for generating control signals;

power driver means responsive to said control signals for generating driver signals;

display means responsive to said driver signals for generating alpha-numeric displays giving real-time acceleration values of the vehicle movement in all three axes in human readable form;

a digital control unit responsive to said driver signals for generating digital acceleration signals and a digital gauge member responsive to said digital acceleration signals for displaying acceleration values sensed by said accelerometers; and a servo control unit responsive to said driver signals, a servo motor electrically connected to said servo control unit and said display means being at least one analog gauge having a needle connected to said servo control unit for displaying acceleration values sensed by said accelerometers on said display means.

2. An acceleration gauge according to claim 1 wherein said one axis is the longitudinal axis of the vehicle and said second axis is the axis orthogonal to said one axis and said third axis is the vertical axis of the vehicle.

3. An acceleration gauge according to claim 1 additionally including a light source control unit responsive to said driver signals for generating light source control signals to a plurality of lighting devices in said gauges for displaying acceleration values sensed by said accelerometers.

4. An acceleration gauge according to claim 1 vertical acceleration display gauge responding to said accelerometers and said algorithm for displaying vertical accelerations.

5. An acceleration gauge according to claim 1 wherein said display means has indices in both acceleration values and angular values.

* * * * *